United States Patent
Kiuchi et al.

(10) Patent No.: US 9,985,467 B2
(45) Date of Patent: May 29, 2018

(54) CONTROL DEVICE OF POWER STORAGE APPARATUS, WIND POWER GENERATION SYSTEM, AND CONTROL METHOD OF POWER STORAGE APPARATUS

(71) Applicant: KABUSHIKI KAISHA TOSHIBA, Minato-ku (JP)

(72) Inventors: Masako Kiuchi, Fuchu (JP); Mami Mizutani, Hachioji (JP); Toshimasa Yamada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 121 days.

(21) Appl. No.: 14/994,571

(22) Filed: Jan. 13, 2016

(65) Prior Publication Data

US 2016/0233690 A1 Aug. 11, 2016

(30) Foreign Application Priority Data

Feb. 10, 2015 (JP) .................................. 2015-024455

(51) Int. Cl.
| | |
|---|---|
| *H02J 7/32* | (2006.01) |
| *H02J 3/38* | (2006.01) |
| *H02J 7/34* | (2006.01) |
| *H02J 7/04* | (2006.01) |

(52) U.S. Cl.
CPC ............... *H02J 7/32* (2013.01); *H02J 3/386* (2013.01); *H02J 7/34* (2013.01); *H02J 7/042* (2013.01); *Y02E 10/763* (2013.01); *Y02E 10/766* (2013.01)

(58) Field of Classification Search
CPC ...................................................... H02J 7/007
USPC ........................................................ 320/101
See application file for complete search history.

(56) References Cited

U.S. PATENT DOCUMENTS

| | | | | |
|---|---|---|---|---|
| 8,471,520 B2 * | 6/2013 | Coe | ......................... | H02J 7/007 |
| | | | | 307/46 |
| 8,575,888 B2 * | 11/2013 | Bando | ...................... | H02J 7/34 |
| | | | | 320/101 |
| 8,749,202 B2 * | 6/2014 | Ishibashi | ............. | B60L 11/1809 |
| | | | | 320/101 |

(Continued)

FOREIGN PATENT DOCUMENTS

JP 2014-87239 A 5/2014

*Primary Examiner* — Samuel Berhanu
*Assistant Examiner* — Tessema Kebede
(74) *Attorney, Agent, or Firm* — Oblon, McClelland, Maier & Neustadt, L.L.P.

(57) ABSTRACT

A control device of a power storage apparatus according to an embodiment includes a wind speed acquiring device, a power generation output detector, a capacity detector, and a controller. The wind speed acquiring device acquires a wind speed. The power generation output detector detects a power generation output of a wind power generation apparatus connected to a power system. The capacity detector detects a remaining capacity of the power storage apparatus that stores at least a portion of a power in the power generation output and supplies at least a portion of the stored power to the power system. The controller controls storage and supply of the power to suppress a variation in a combined output obtained by combining the power generation output and the power stored or supplied by the power storage apparatus, based on the wind speed, the power generation output, and the remaining capacity.

8 Claims, 13 Drawing Sheets

(56) References Cited

U.S. PATENT DOCUMENTS

| | | | |
|---|---|---|---|
| 8,970,058 B2* | 3/2015 | Hoshihira | H02J 7/0068 290/44 |
| 2010/0078940 A1* | 4/2010 | Kondo | F03D 7/047 290/44 |
| 2014/0042747 A1* | 2/2014 | Hoshihira | H02J 7/0068 290/50 |
| 2014/0184136 A1* | 7/2014 | Ture | H02J 7/0052 320/101 |

* cited by examiner

CONTROL DEVICE OF POWER STORAGE APPARATUS, WIND POWER GENERATION SYSTEM, AND CONTROL METHOD OF POWER STORAGE APPARATUS

CROSS REFERENCE TO RELATED APPLICATIONS

This application is based upon and claims the benefit of priority from the prior Japanese Patent Application No. 2015-24455, filed on Feb. 10, 2015, the entire contents of which are incorporated herein by reference.

FIELD

Embodiments relate to a control device of a power storage apparatus, a wind power generation system, and a control method of a power storage apparatus.

BACKGROUND

Recently, a wind energy is actively introduced as one of renewable energies. The wind energy is an unstable energy that varies with a variation in a wind speed. Therefore, in a case where the wind energy is interconnected with a power system without consideration of its variation, there is a risk that stable supply of a power is hindered. For a system interconnection of the wind energy, regulations on a variation width of the wind energy, for example, are provided in order to suppress a variation in the power supplied to the power system.

There is known a technique in which a wind power generation apparatus and a power storage apparatus are provided together, as a technique for suppressing the variation in the power supplied to the power system. The power storage apparatus stores (that is, charges) a generated power of the wind power generation apparatus and supplies (that is, discharges) the stored power to the power system, for absorbing a variation in the generated power of the wind power generation apparatus.

However, the conventional technique cannot cause the power storage apparatus to store or supply the power without excess or deficiency, while sufficiently considering a long-term change in a capacity of the power storage apparatus. Therefore, there is a problem that a shortage of the capacity of the power storage apparatus while the power storage apparatus supplies the power causes difficulty in suppressing the variation in the power supplied to the power system, for example.

DETAILED DESCRIPTION

A control device of a power storage apparatus according to an embodiment includes a wind speed acquiring device, a power generation output detector, a capacity detector, and a controller. The wind speed acquiring device acquires a wind speed. The power generation output detector detects a power generation output of a wind power generation apparatus connected to a power system. The capacity detector detects a remaining capacity of the power storage apparatus that stores at least a portion of a power in the power generation output and supplies at least a portion of the stored power to the power system. The controller controls storage and supply of the power to suppress a variation in a combined output obtained by combining the power generation output and the power stored or supplied by the power storage apparatus, based on the wind speed, the power generation output, and the remaining capacity.

Embodiments will now be explained with reference to the accompanying drawings. The present invention is not limited to the embodiments.

(First Embodiment)

Figure 1:
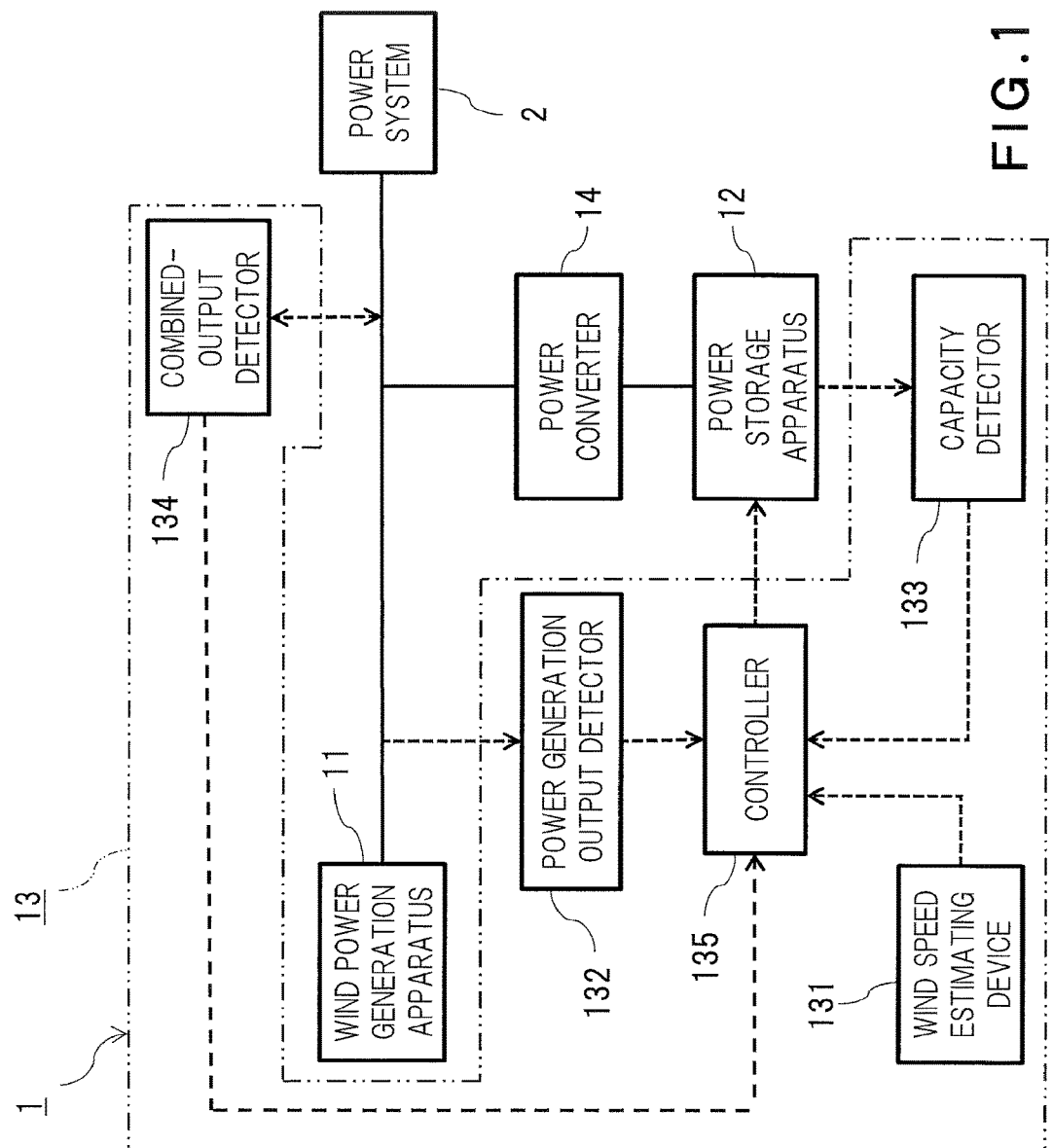
FIG. 1 is a block diagram of a wind power generation system 1 according to a first embodiment.
Figure 2:
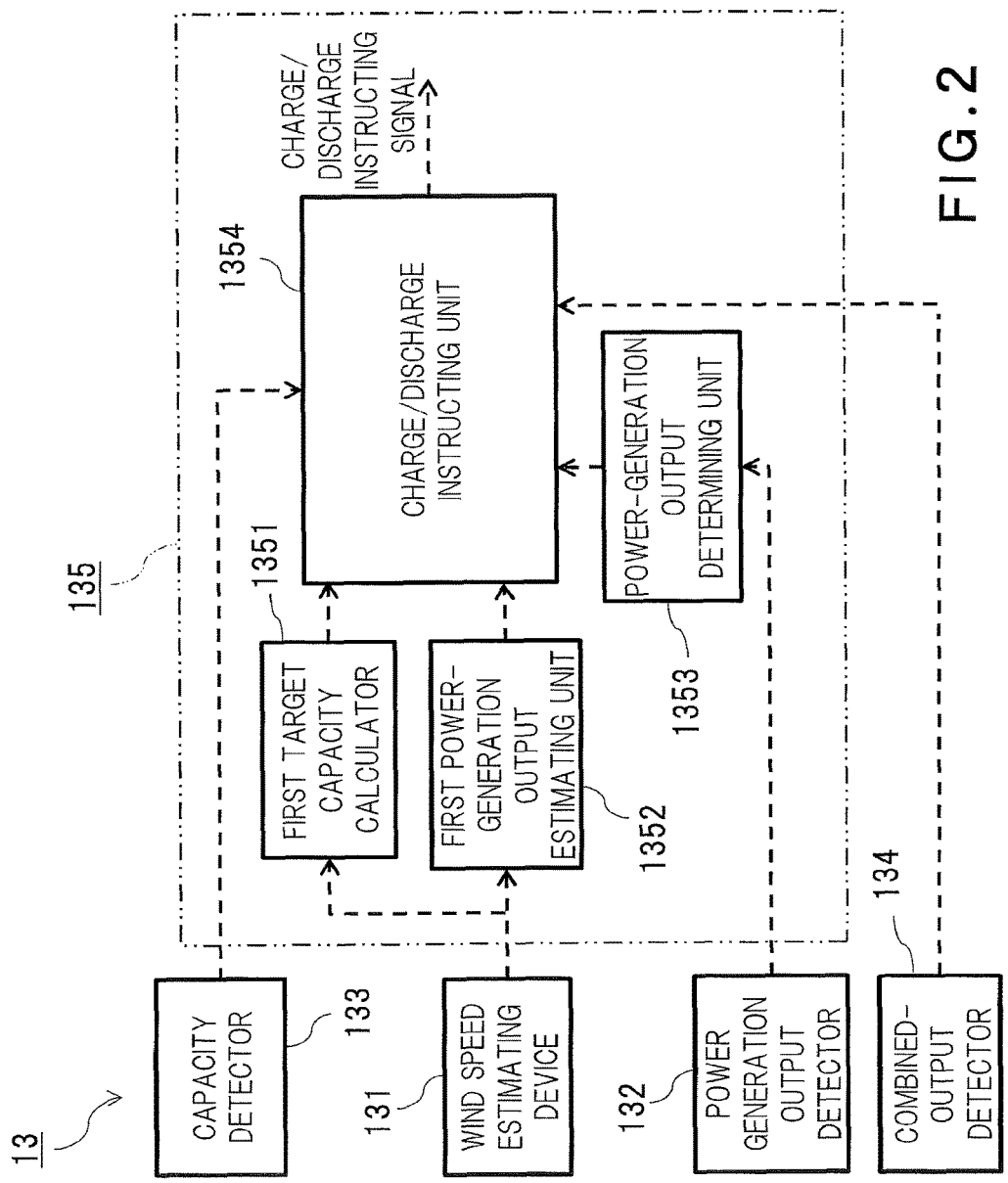
FIG. 2 is a block diagram of a control device 13 of a power storage apparatus 12 in the wind power generation system 1 of FIG. 1.

FIG. 1 is a block diagram of a wind power generation system 1 according to a first embodiment. FIG. 2 is a block diagram of a control device 13 of a power storage apparatus 12 in the wind power generation system 1 of FIG. 1. In FIG. 1, a solid line represents a power line through which a power flows, and a broken line represents a signal line through which a signal flows. In FIG. 2, the broken line represents a signal line.

As shown in FIG. 1, the wind power generation system 1 includes a wind power generation apparatus 11, the power storage apparatus 12, the control device 13, and a power converter 14.

The wind power generation apparatus 11 is connected to a power system 2. The wind power generation apparatus 11 generates a power by a power generation method using a wind power. The wind power generation apparatus 11 interconnects with the power system 2 to supply (transmit) a power generated by the wind power generation apparatus 11, that is, a power generation output (hereinafter, also referred to as "wind-power-generation output") to the power system 2. The wind power generation apparatus 11 includes one or more windmills each having a power generator therein, for example. The wind power generation apparatus 11 may be provided in an assembled wind power plant (a wind farm).

The power storage apparatus 12 is connected to the wind power generation apparatus 11 and the power system 2 via the power converter 14. The power storage apparatus 12 stores at least a portion of a power in the wind-power-generation output. The power storage apparatus 12 also supplies at least a portion of the stored power to the power system 2. The power converter 14 performs power conversion of the wind-power-generation output and then stores it in the power storage apparatus 12. The power converter 14 also performs power conversion of the power stored in the power storage apparatus 12 and then supplies it to the power system 2.

The power storage apparatus 12 performs charge and discharge to suppress a variation in a combined output obtained by combining the wind-power-generation output and the power stored or supplied by the power storage apparatus 12 (hereinafter, also referred to as "charge/discharge output") based on a charge/discharge instructing signal described later. The combined output is a value obtained by subtracting the charge output (the stored power) from the wind-power-generation output in a case where the power storage apparatus 12 performs charge, and is a value obtained by adding the discharge output (the supplied power) to the wind-power-generation output in a case where the power storage apparatus 12 performs discharge. It is enough that the variation in the combined output falls within a variation width defined by a condition of interconnection of the wind power generation apparatus 11 and the power system 2.

The power storage apparatus 12 includes a single battery (a cell) or a plurality of batteries (cells). The specific mode of the battery is not particularly limited, as long as it is a chargeable/dischargeable secondary battery.

The control device 13 outputs the charge/discharge instructing signal to the power storage apparatus 12 to control storage and supply of the power by the power storage apparatus 12 (hereinafter, also referred to as "charge/discharge control"). The charge/discharge instructing signal is a signal indicating a charge/discharge instructing value described later. The control device 13 may output a new charge/discharge instructing signal every predetermined control period.

The control device 13 includes a wind speed estimating device 131 as a wind speed acquiring device, a power generation output detector 132, a capacity detector 133, a combined-output detector 134, and a controller 135.

The wind speed estimating device 131 acquires a current wind speed by estimation (calculation). The wind speed estimating device 131 outputs a wind speed signal indicating the estimated wind speed to the controller 135. The wind speed estimating device 131 estimates the wind speed based on at least one of a mathematical model and a statistical model, for example. The wind speed estimating device 131 may estimate the wind speed based on a Kalman filter or a wind condition model, for example. The method used in estimation of the wind speed by the wind speed estimating device 131 is not limited to the above. The wind speed estimated by the wind speed estimating device 131 can be used for the charge/discharge control considering a long-term variation in a remaining capacity of the power storage apparatus 12, as described later.

The power generation output detector 132 detects the wind-power-generation output. The power generation output detector 132 outputs a wind-power-generation output signal indicating the detected wind-power-generation output to the controller 135.

The capacity detector 133 detects the remaining capacity of the power storage apparatus 12 every unit time. The capacity detector 133 outputs a capacity signal indicating the detected remaining capacity to the controller 135. The remaining capacity may be SOC (State Of Charge), for example. The unit time may be the same as the control period of the control device 13, but is not limited thereto. The remaining capacity detected by the capacity detector 133 can be used for the charge/discharge control considering the long-term variation in the remaining capacity, as described later.

The combined-output detector 134 detects the combined output. The combined-output detector 134 outputs a combined-output signal indicating the detected combined output to the controller 135.

The controller 135 performs the charge/discharge control to suppress a variation in the combined output based on the wind speed indicated by the wind speed signal, the wind-power-generation output indicated by the wind-power-generation output signal, the remaining capacity indicated by the capacity signal, and the combined output indicated by the combined-output signal.

As shown in FIG. 2, the controller 135 includes a first target capacity calculator 1351, a first power-generation output estimating unit 1352, a power-generation output determining unit 1353, and a charge/discharge instructing unit 1354.

The first target capacity calculator 1351 uses the wind speed signal from the wind speed estimating device 131 as an input to calculate a target capacity of the power storage apparatus 12 every unit time based on the wind speed indicated by the wind speed signal. The target capacity of the power storage apparatus 12 is a remaining capacity of the power storage apparatus 12 that is a target. The first target capacity calculator 1351 outputs a target capacity signal indicating the calculated target capacity to the charge/discharge instructing unit 1354. The target capacity calculated by the first target capacity calculator 1351 can be used for the charge/discharge control considering the long-term variation in the remaining capacity, as described later.

The first power-generation output estimating unit 1352 uses the wind speed signal from the wind speed estimating device 131 as an input to calculate a wind-speed variation amount every unit time based on the wind speed indicated by the wind speed signal. The wind-speed variation amount may be a parameter indicating a change (a temporal change) in the wind speed per set time (hereinafter, also referred to as "reference time"). The wind-speed variation amount is defined such that a variation amount in a direction in which the wind speed increases has a positive value and a variation amount in a direction in which the wind speed decreases has a negative value, for example. The wind-speed variation amount may be an inclination of the wind speed, that is, a time differentiation of the wind speed, for example. When the reference time of the wind-speed variation amount is set to be variable, it is possible to simply modify (change) a method for estimating increase/decrease in the wind-power-generation output.

The first power-generation output estimating unit 1352 estimates the increase/decrease in the wind-power-generation output based on the calculated wind-speed variation amount. The first power-generation output estimating unit 1352 outputs an increase/decrease estimating signal indicating the estimated increase/decrease in the wind-power-generation output to the charge/discharge instructing unit 1354. The increase/decrease in the wind-power-generation output estimated by the first power-generation output estimating unit 1352 can be used for the charge/discharge control considering the long-term variation in the remaining capacity, as described later.

The increase/decrease in the wind-power-generation output estimated by the first power-generation output estimating unit 1352 is increase/decrease estimated based on the wind-speed variation amount (the wind speed), but does not consider the magnitude of the wind-power-generation output determined by the power-generation output determining unit 1353 that is described later. When the magnitude of the wind-power-generation output determined by the power-generation output determining unit 1353 is considered together, the increase/decrease in the wind-power-generation output to be estimated (supposed) in determination of the charge/discharge instructing value that is described later is contrary to the increase/decrease estimated by the first power-generation output estimating unit 1352 in some cases. The details thereof are described later.

The power-generation output determining unit 1353 uses the wind-power-generation output signal from the power generation output detector 132 as an input to determine a current magnitude of the wind-power-generation output indicated by the wind-power-generation output signal. The power-generation output determining unit 1353 outputs a power-generation output determining signal indicating the determined magnitude of the wind-power-generation output to the charge/discharge instructing unit 1354. The magnitude of the wind-power-generation output determined by the power-generation output determining unit 1353 can be used for the charge/discharge control considering the long-term variation in the remaining capacity, as described later.

The charge/discharge instructing unit 1354 determines the power to be stored or supplied by the power storage apparatus 12 as a power that can suppress a variation in the combined output. Specifically, the charge/discharge instructing unit 1354 determines a charge/discharge instructing value indicating the power to be stored or supplied by the power storage apparatus 12.

The charge/discharge instructing unit 1354 performs charge/discharge control by instructing the power storage apparatus 12 to store or supply the determined power. Specifically, the charge/discharge instructing unit 1354 outputs the charge/discharge instructing value as a charge/discharge instructing signal to the power storage apparatus 12, thereby instructing the charge/discharge in accordance with the charge/discharge instructing value.

The charge/discharge instructing unit 1354 inputs the target capacity signal, the capacity signal, the increase/decrease estimating signal, the power-generation output determining signal, and the combined-output signal thereto. The charge/discharge instructing unit 1354 then determines the charge/discharge instructing value based on the target capacity indicated by the target capacity signal, the remaining capacity indicated by the capacity signal, the increase/decrease in the wind-power-generation output indicated by the increase/decrease estimating signal, the magnitude of the wind-power-generation output indicated by the power-generation output determining signal, and the combined output indicated by the combined-output signal. The charge/discharge instructing unit 1354 can use a magnitude relation between the target capacity and the remaining capacity for determination of the charge/discharge instructing value.

In a case where the charge/discharge instructing value is determined based on the wind-power-generation output and the remaining capacity only without estimation (acquisition) of the wind speed, it is difficult to perform the charge/discharge control considering the long-term variation in the remaining capacity. For example, because decrease in the wind-power-generation output caused by future decrease in the wind speed cannot be estimated, it is not possible to consider possibility that discharge for suppressing the decrease in the combined output becomes necessary and the remaining capacity is decreased. Therefore, even when discharge is performed at a time when the discharge becomes necessary, the variation (decrease) in the combined output may not be able to be suppressed because of a shortage of the remaining capacity.

Further, in a case where the charge/discharge instructing value is determined without detection of the remaining capacity, the charge/discharge control avoiding a future shortage of the capacity of the power storage apparatus 12 is difficult, as in the case where the wind speed is not acquired. Therefore, also in the case where the remaining capacity is not detected, there is a possibility that the variation in the combined output cannot be suppressed.

However, in the first embodiment, the charge/discharge instructing value considering both the wind speed and the remaining capacity is determined, so that the variation in the combined output can be surely suppressed. In addition, determination of the charge/discharge instructing value based on the target capacity enables the capacity shortage of the power storage apparatus 12 caused by unbalanced charge and discharge to be avoided more simply and more surely. Furthermore, when the charge/discharge instructing value is determined based on the estimated increase/decrease in the wind-power-generation output (the wind-speed variation amount), the charge/discharge can be efficiently performed in such a manner that the charge amount is increased in a case where the increase in the wind-power-generation output is estimated, for example.

Next, an operation example of the wind power generation system 1 having the above configuration is described with reference to FIGS. 3 to 7.

Figure 3:
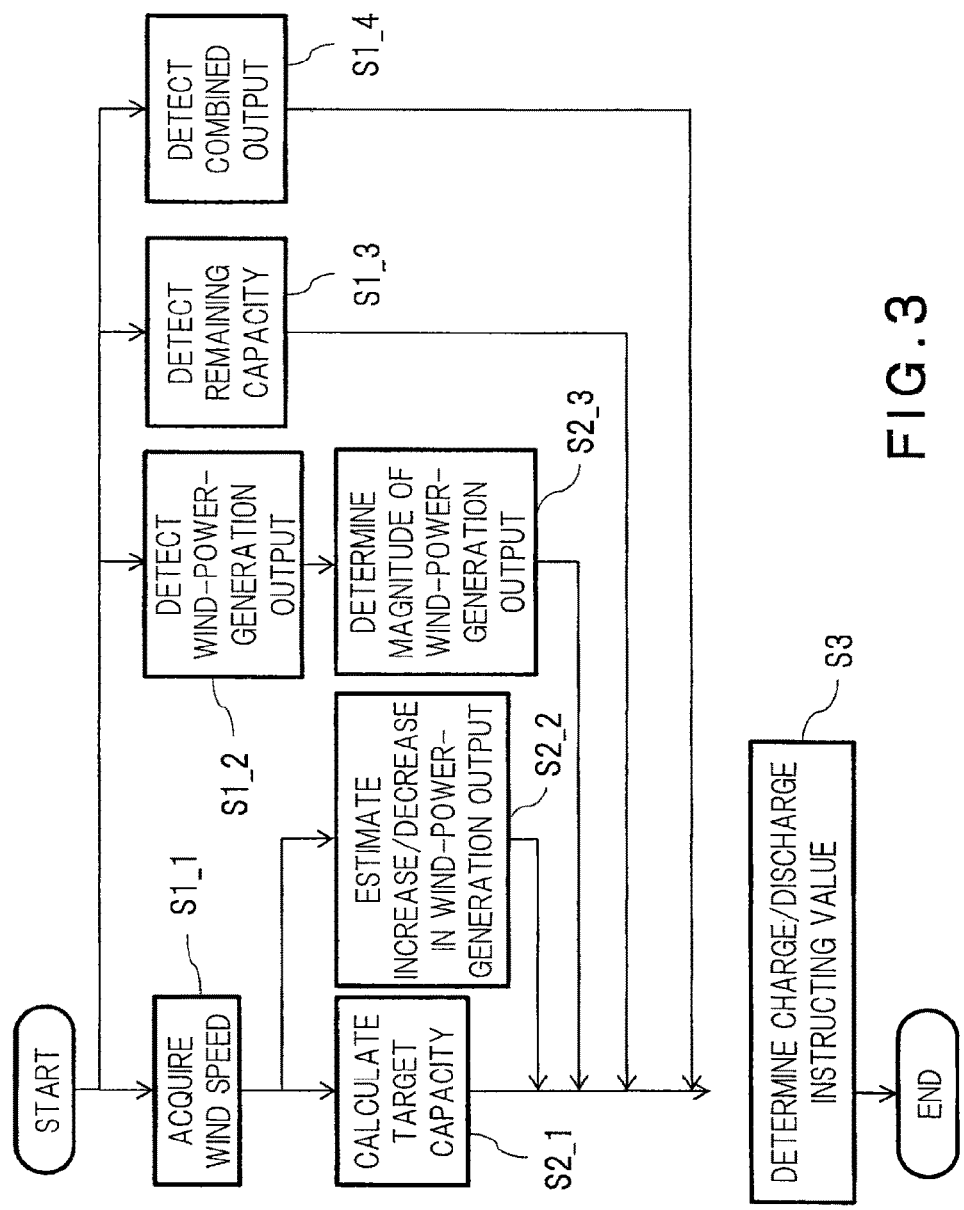
FIG. 3 is a flowchart of a control method of the power storage apparatus according to the first embodiment.

FIG. 3 is a flowchart of a control method of the power storage apparatus 12 according to the first embodiment. FIG. 3 may be a flowchart per control period of the control device 13. In this case, it suffices that the control device 13 performs processes in the flowchart of FIG. 3 repeatedly.

Figure 4:
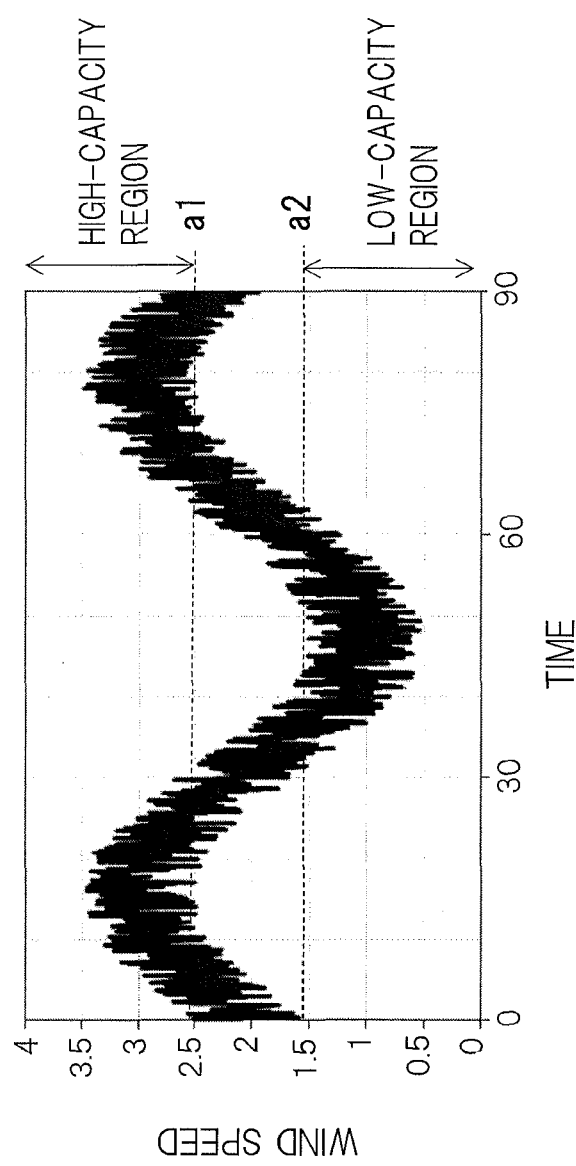
FIG. 4 is a graph showing an operation example of a first target capacity calculator 1351 in the control device 13 of FIG. 2.

FIG. 4 is a graph showing an operation example of the first target capacity calculator 1351 in the control device 13 of FIG. 2. In FIG. 4, the horizontal axis represents time (minute) and the vertical axis represents a wind speed. FIG. 4 shows a correspondence between regions on the vertical axis to which the wind speed belongs and a target capacity.

Figure 5:
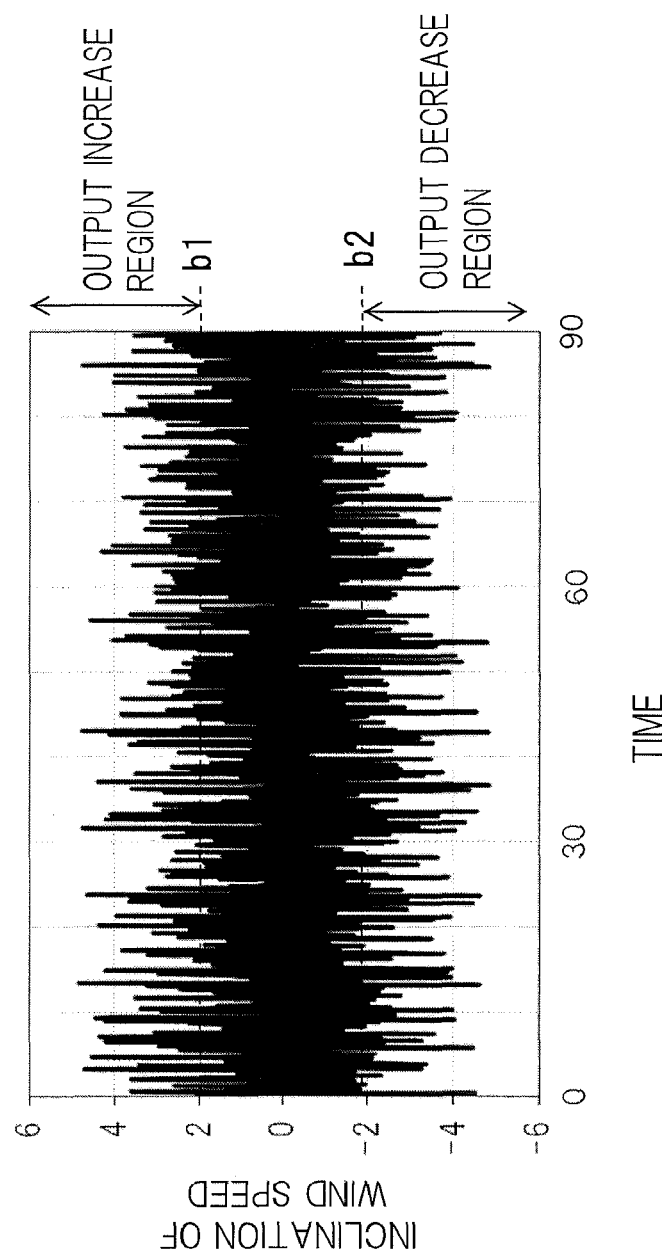
FIG. 5 is a graph showing an operation example of a first power-generation output estimating unit 1352 in the control device 13 of FIG. 2.

FIG. 5 is a graph showing an operation example of the first power-generation output estimating unit 1352 in the control device 13 of FIG. 2. In FIG. 5, the horizontal axis represents the time (minute) and the vertical axis represents an inclination of the wind speed (a wind-speed variation amount). FIG. 5 shows a correspondence between regions on the vertical axis to which the inclination of the wind speed belongs and estimated increase/decrease in a wind-power-generation output.

Figure 6:
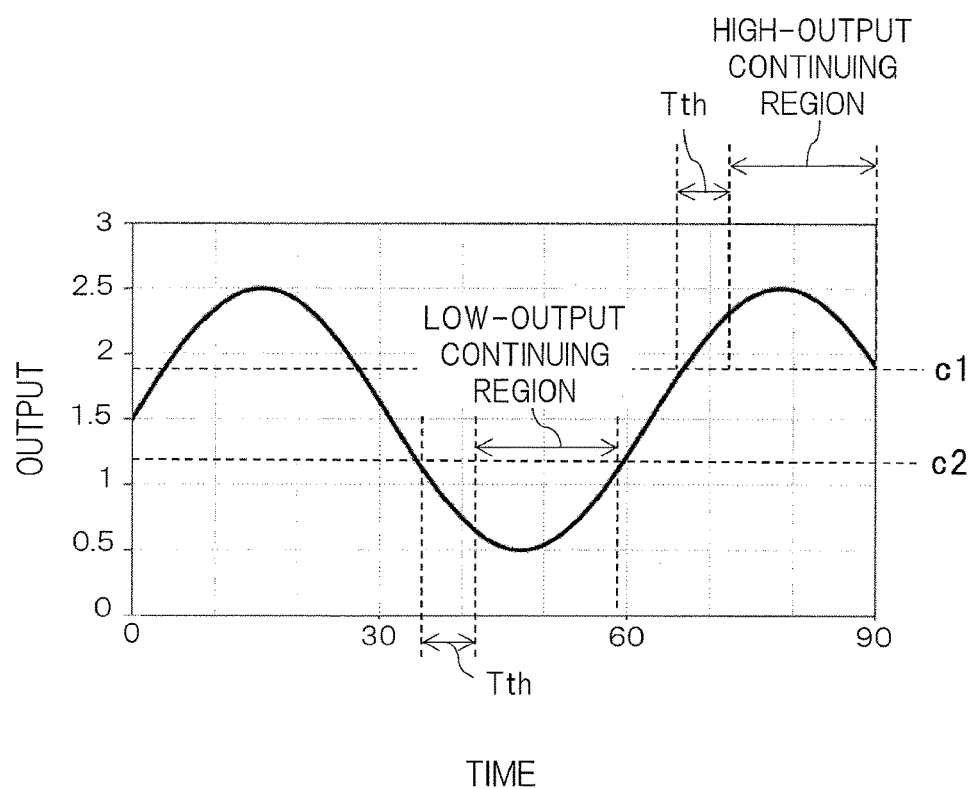
FIG. 6 is a graph showing an operation example of a power-generation output determining unit 1353 in the control device 13 of FIG. 2.

FIG. 6 is a graph showing an operation example of the power-generation output determining unit 1353 in the control device 13 of FIG. 2. In FIG. 6, the horizontal axis represents the time (minute) and the vertical axis represents an output (a wind-power-generation output). FIG. 6 shows a correspondence between regions to which the output belongs and a state of a magnitude of the output.

Figure 7:
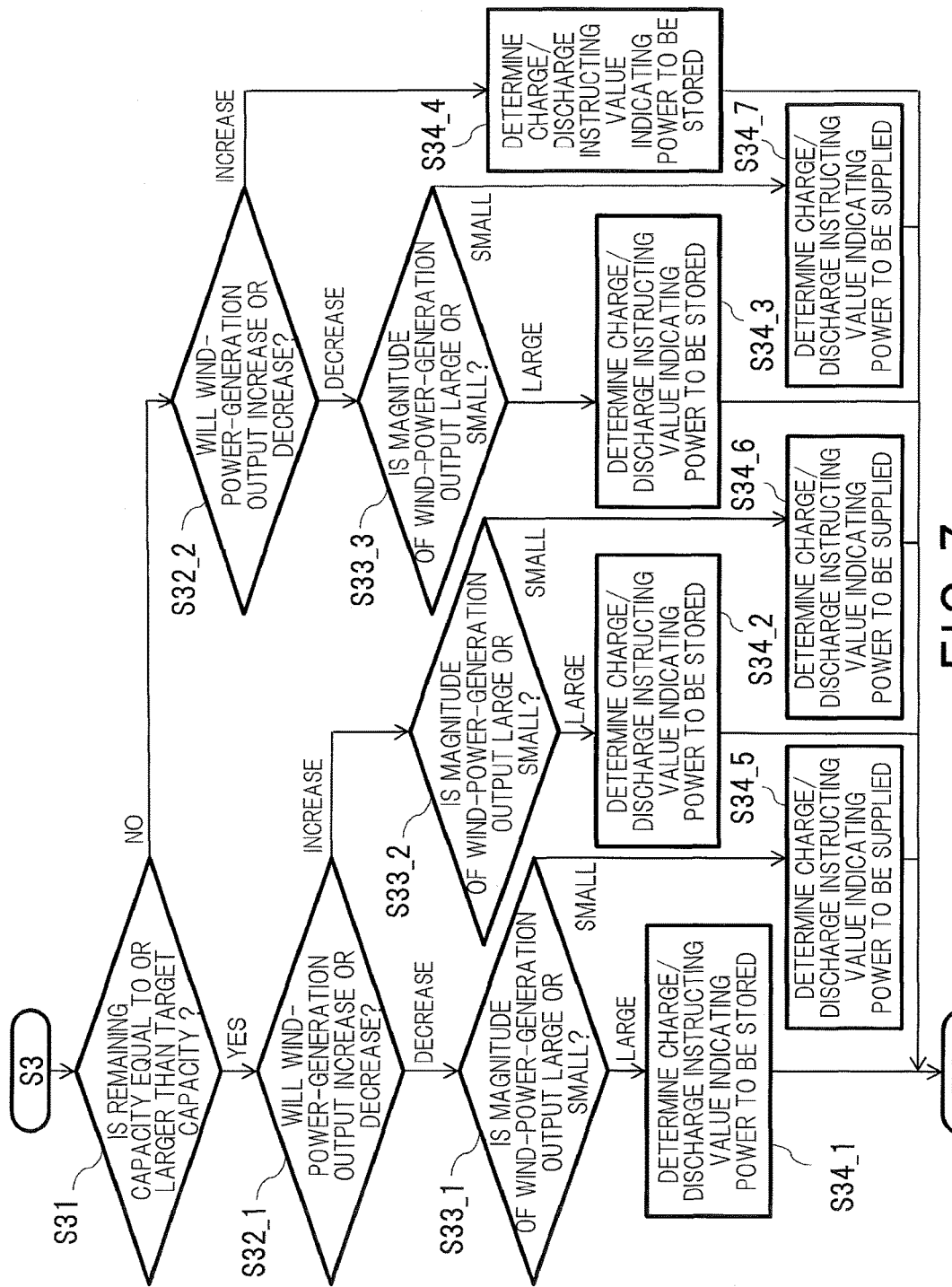
FIG. 7 is a flowchart showing details of a step of determining a charge/discharge instructing value in FIG. 3.

FIG. 7 is a flowchart showing details of a step of determining the charge/discharge instructing value in FIG. 3.

First, the wind speed estimating device 131 estimates a wind speed to acquire the wind speed (Step S1_1), as shown in FIG. 3, and outputs a wind speed signal to the first target capacity calculator 1351 and the first power-generation output estimating unit 1352.

The power generation output detector 132 detects a wind-power-generation output (Step S1_2), and outputs a wind-power-generation output signal to the power-generation output determining unit 1353.

The capacity detector 133 detects a remaining capacity (Step S1_3), and outputs a capacity signal to the charge/discharge instructing unit 1354 in the controller 135.

The combined-output detector 134 detects a combined output (Step S1_4), and outputs a combined-output signal to the charge/discharge instructing unit 1354.

Subsequently, the first target capacity calculator 1351 calculates a target capacity based on the wind speed indicated by the wind speed signal input from the wind speed estimating device 131 (Step S2_1), and outputs a target capacity signal to the charge/discharge instructing unit 1354.

For example, the first target capacity calculator 1351 determines to which of a high-capacity region and a low-capacity region the wind speed on the vertical axis in FIG. 4 belongs at a calculation time that comes every unit time in the horizontal axis (for example, this may be 1 sec. or a period of data collection or the like). The high-capacity region is a region to which a wind speed equal to or larger than a first wind-speed threshold value a1 belongs and for which the target capacity should be set to a large value. The low-capacity region is a region to which a wind speed smaller than a second wind-speed threshold value a2 that is smaller than the first wind-speed threshold value a1 belongs and for which the target capacity should be set to a small value. When the wind speed belongs to the high-capacity region, the first target capacity calculator 1351 calculates (sets) a first target capacity corresponding to the high-capacity region as the target capacity. When the wind speed belongs to the low-capacity region, the first target capacity calculator 1351 calculates a second target capacity corresponding to the low-capacity region as the target capacity. When the wind speed does not belong to any of the high-capacity region and the low-capacity region, the first target capacity calculator 1351 may set SOC 50% that can suppress degradation of a battery and can deal with both charge and discharge, as the target capacity. Further, the first target capacity calculator 1351 may acquire a smooth waveform of the wind speed (see FIG. 6) by relieving short-period components of a waveform of the wind speed in FIG. 4 with a primary delay or a moving average. In addition, the first target capacity calculator 1351 may calculate the target capacity by using the acquired smooth waveform of the wind speed.

The calculation of the target capacity may be performed by setting of a flag or the like indicating the target capacity, for example, but is not limited thereto. Also, the specific modes of the first wind-speed threshold value a1 and the second wind-speed threshold value a2 are not particularly limited, and may be set to suitable values based on an experiment or a simulation, for example.

With the first target capacity calculator 1351, it is possible to set the target capacity to be larger, considering the increase in the wind-power-generation output, when the wind speed is large. On the other hand, when the wind speed is small, it is possible to set the target capacity to be smaller, considering the decrease in the wind-power-generation output. Therefore, the target capacity can be set to a value matching the wind speed. Also, the target capacity can be simply calculated based on the threshold values of the wind speed. The simple and appropriate calculation of the target capacity enables simple and appropriate determination of the charge/discharge instructing value based on the target capacity.

As shown in FIG. 3, the first power-generation output estimating unit 1352 estimates increase/decrease in the wind-power-generation output based on the wind speed indicated by the wind speed signal input from the wind speed estimating device 131 (Step S2_2), and outputs an increase/decrease estimating signal to the charge/discharge instructing unit 1354.

For example, the first power-generation output estimating unit 1352 determines to which of an output increase region and an output decrease region the inclination of the wind speed on the vertical axis in FIG. 5 belongs at an estimation time that comes every unit time (for example, this may be 1 sec. or the period of data collection or the like) in the horizontal axis. The output increase region is a region to which the inclination of the wind speed equal to or larger than a first inclination threshold value b1 belongs and for which it should be estimated that the wind-power-generation output will increase. The output decrease region is a region to which the inclination of the wind speed smaller than a second inclination threshold value b2 that is smaller than the first inclination threshold value b1 belongs and for which it should be estimated that the wind-power-generation output will decrease. When the inclination of the wind speed belongs to the output increase region, the first power-generation output estimating unit 1352 estimates the increase in the wind-power-generation output. When the inclination of the wind speed belongs to the output decrease region, the first power-generation output estimating unit 1352 estimates the decrease in the wind-power-generation output. When the inclination of the wind speed does not belong to any of the output increase region and the output decrease region, the first power-generation output estimating unit 1352 may estimate that a current wind-power-generation output will be maintained. Further, the first power-generation output estimating unit 1352 may acquire a smooth waveform of the inclination of the wind speed by relieving short-period components of a waveform of the inclination of the wind speed in FIG. 5 with a primary delay or a moving average. In addition, the first power-generation output estimating unit 1352 may estimate the increase/decrease in the wind-power-generation output by using the acquired smooth waveform of the inclination of the wind speed.

The estimation of the increase/decrease in the wind-power-generation output may be performed by setting of a flag or the like indicating a result of the estimation of the increase/decrease, but is not limited thereto. Also, the specific modes of the first inclination threshold value b1 and the second inclination threshold value b2 are not particularly limited, and may be set to suitable values based on an experiment or a simulation, for example.

With the first power-generation output estimating unit 1352, it is possible to estimate the increase in the wind-power-generation output when the inclination of the wind speed is large, and to estimate the decrease in the wind-power-generation output when the inclination of the wind speed is small. Therefore, the increase/decrease in the wind-power-generation output can be estimated with high accuracy. Also, the increase/decrease in the wind-power-generation output can be simply estimated based on the threshold values of the inclination of the wind speed. Because the increase/decrease in the wind-power-generation output can be estimated simply with high accuracy, it is possible to determine the charge/discharge instructing value simply with high accuracy based on the estimated increase/decrease in the wind-power-generation output.

As shown in FIG. 3, the power-generation output determining unit 1353 determines a magnitude of the wind-power-generation output based on the wind-power-generation output indicated by a wind-power-generation output signal input from the power generation output detector 132 (Step S2_3), and outputs a power-generation output determining signal to the charge/discharge instructing unit 1354.

For example, the power-generation output determining unit 1353 relieves short-period variation components of the wind-power-generation output input from the power generation output detector 132 to convert that wind-power-generation output to a wind-power-generation output having a smooth waveform shown in FIG. 6. The power-generation output determining unit 1353 may relieve the short-period variation components by obtaining a primary delay or a moving average of the wind-power-generation output. The power-generation output determining unit 1353 determines the magnitude of the wind-power-generation output by using the wind-power-generation output having the converted waveform. For example, the power-generation output determining unit 1353 determines to which of a high-output continuing region or a low-output continuing region the wind-power-generation output on the vertical axis in FIG. 6 belongs every determination period (for example, this may be 1 sec. or the period of data collection or the like) in the horizontal axis.

The high-output continuing region is a region in which the wind-power-generation output equal to or larger than a first output threshold value $c_1$ continues for a time period equal to or longer than a threshold time Tth and for which it should be determined that the wind-power-generation output is large. The low-output continuing region is a region in which the wind-power-generation output smaller than a second output threshold value $c_2$ that is smaller than the first output threshold value $c_1$ continues for a time period equal to or longer than the threshold time Tth and for which it should be determined that the wind-power-generation output is small. When the wind-power-generation output belongs to the high-output continuing region, the power-generation output determining unit 1353 determines that the wind-power-generation output is large. When the wind-power-generation output belongs to the low-output continuing region, the power-generation output determining unit 1353 determines that the wind-power-generation output is small. When the wind-power-generation output does not belong to any of the high-output continuing region and the low-output continuing region, the power-generation output determining unit 1353 may determine that the magnitude of the wind-power-generation output is normal.

The determination of the magnitude of the wind-power-generation output may be performed by setting of a flag or the like indicating a result of the determination, but is not limited thereto. Also, the specific modes of the first output threshold value $c_1$, the second output threshold value $c_2$, and the threshold time Tth are not particularly limited, and may be set to suitable values based on an experiment or a simulation, for example.

With the power-generation output determining unit 1353, it is possible to determine the magnitude of the wind-power-generation output based on the threshold values of the wind-power-generation output simply and correctly. Because the magnitude of the wind-power-generation output can be determined simply and correctly, it is possible to determine the charge/discharge instructing value based on the determination result of the magnitude of the wind-power-generation output simply and correctly.

In a case where a state of the high wind-power-generation output continues, even when the increase in the wind-power-generation output is estimated based on the wind-speed variation amount, it should be estimated (supposed) that a sharp drop will occur after the estimated increase, from a long-term perspective. By considering the result of the determination by the power-generation output determining unit 1353, it is possible to suppose more exact increase/decrease in the wind-power-generation output from the long-term perspective and determine a more exact charge/discharge instructing value, as compared with a case of considering the result of the estimation by the first power-generation output estimating unit 1352 only.

Subsequently, as shown in FIG. 3, the charge/discharge instructing unit 1354 determines the charge/discharge instructing value (Step S3), and outputs a charge/discharge instructing signal indicating the determined charge/discharge instructing value to the power storage apparatus 12. The determination of the charge/discharge instructing value is performed based on the target capacity input from the first target capacity calculator 1351, the estimation result of the increase/decrease in the wind-power-generation output input from the first power-generation output estimating unit 1352, the determination result of the magnitude of the wind-power-generation output input from the power-generation output determining unit 1353, and the combined output input from the combined-output detector 134.

Next, the charge/discharge instructing value determined by the charge/discharge instructing unit 1354 is described in more detail by using FIG. 7. As shown in FIG. 7, the charge/discharge instructing unit 1354 determines the charge/discharge instructing value indicating the power to be stored in the following cases (1) to (4).

(1) A case where the remaining capacity is equal to or larger than the target capacity (Step S31: Yes), the increase in the wind-power-generation output has been estimated in the first power-generation output estimating unit 1352 (Step S32_1: Increase), and it has been determined in the power-generation output determining unit 1353 that the wind-power-generation output is large (Step S33_1: Large).

In the case (1), even when the increase in the wind-power-generation output has been estimated based on the wind-speed variation amount, a sharp drop of the wind-power-generation output after the increase should be supposed, considering that the state of the high wind-power-generation output continues. Therefore, in the case (1), the charge/discharge instructing value indicating the power to be stored is determined in order to reserve a power that can be supplied to the power system 2 for preparing the sharp drop of the wind-power-generation output even when the remaining capacity is sufficient (Step S34_1). By determining the charge/discharge instructing value on a charge side in this manner, it is possible to surely suppress a variation in the combined output even when the wind-power-generation output sharply drops.

(2) A case where the remaining capacity is equal to or larger than the target capacity (Step S31: Yes), the decrease in the wind-power-generation output has been estimated (Step S32_1: Decrease), and wind-power-generation output has been determined to be large (Step S33_2: Large).

In the case (2), the charge/discharge instructing value indicating the power to be stored is determined for the same reason as that in the case (1) (Step S34_2).

(3) A case where the remaining capacity is smaller than the target capacity (Step S31: No), the increase in the wind-power-generation output has been estimated (Step S32_2: Increase), and wind-power-generation output has been determined to be large (Step S33_3: Large).

In the case (3), the remaining capacity is not enough, and the sharp drop of the wind-power-generation output should be supposed as in the case (1). Therefore, the charge/discharge instructing value indicating the power to be stored is determined (Step S34_3). In a case where the wind-power-generation output sharply drops while the remaining capacity is not enough, it is more difficult to supply the power to the power system 2 in such a manner that the variation in the combined output is suppressed, than in a case where the remaining capacity is enough. By determining the charge/discharge instructing value on the charge side as in Step S34_3, the power to be supplied to the power system 2 can be preserved in advance. Due to this configuration, it is possible to surely suppress the variation in the combined output in association with the sharp drop of the wind-power-generation output.

(4) A case where the remaining capacity is smaller than the target capacity (Step S31: No) and the decrease in the wind-power-generation output has been estimated (Step S32_2: Decrease).

In the case (4), the charge/discharge instructing value indicating the power to be stored is determined in order to preserve the power that can be supplied to the power system 2 for preparing the decrease in the wind-power-generation output (Step S34_4). By determining the charge/discharge instructing value on the charge side in this manner, it is possible to surely suppress the variation in the combined output, even when the wind-power-generation output decreases.

Further, the charge/discharge instructing unit 1354 determines the charge/discharge instructing value indicating the power to be supplied in the following cases (5) to (7), as shown in FIG. 7.

(5) A case where the remaining capacity is equal to or larger than the target capacity (Step S31: Yes), the increase in the wind-power-generation output has been estimated (Step S32_1: Increase), and the wind-power-generation output has been determined to be small (Step S33_1: Small).

In the case (5), while a priority is given to bringing the remaining capacity closer to the target capacity, the charge/discharge instructing value indicating the power to be supplied is determined (Step S34_5).

(6) A case where the remaining capacity is equal to or larger than the target capacity (Step S31: Yes), the decrease in the wind-power-generation output has been estimated (Step S32_1: Decrease), and the wind-power-generation output has been determined to be small (Step S33_2: Small).

In the case (6), the charge/discharge instructing value indicating the power to be supplied is determined for the same reason as that in the case (5) (Step S34_6).

(7) A case where the remaining capacity is smaller than the target capacity (Step S31: No), the increase in the wind-power-generation output has been estimated (Step S32_2: Increase), and the wind-power-generation output has been determined to be small (Step S33_3: Small).

In the case (7), it should be supposed that the wind-power-generation output will increase rapidly, considering that a state of the low wind-power-generation output continues. Therefore, in the case (7), the charge/discharge instructing value indicating the power to be supplied is determined (Step S34_7). In the case (7), the charge/discharge instructing value on a discharge side may be determined in order to secure a free capacity of the power storage apparatus 12 for a future charge, supposing that the charge for suppressing the variation in the combined output will be necessary in association with the future rapid increase in the wind-power-generation output.

Figure 8:
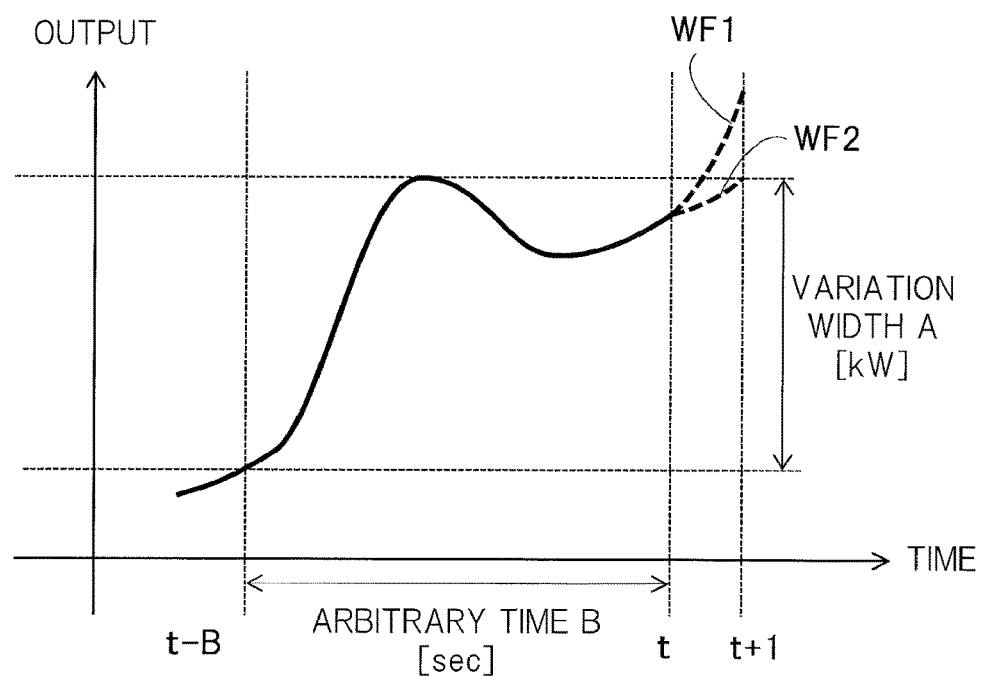
FIG. 8 is a graph showing an operation example of a charge/discharge instructing unit 1354 in the control device 13 of FIG. 2.

The charge/discharge instructing value on the charge side and the discharge side per control period of the control device 13 may be fixed or variable. The charge/discharge instructing unit 1354 may determine a value considering the combined output detected by the combined-output detector 134 as the charge/discharge instructing value. For example, it is assumed that a condition of interconnection with the power system 2 is to bring a variation width of the combined output in an arbitrary time B [sec] within A [kW], as shown in FIG. 8. In this case, the charge/discharge instructing unit 1354 may calculate the variation width of the combined output for the past arbitrary time B [sec] up to a current time t based on the combined output detected by the combined-output detector 134. The wind power generation apparatus 11 is assumed to be interconnected with the system at the current time t. The charge/discharge instructing unit 1354 may calculate an expected value of the combined output at a time (t+1) by adding the charge/discharge instructing value (a charge/discharge output) calculated by the charge/discharge instructing unit 1354 to the variation width of the combined output for the past arbitrary time B [sec]. When the expected value of the combined output exceeds A [kW] as shown with a waveform WF1 in FIG. 8, the charge/discharge instructing unit 1354 may correct the charge/discharge instructing value in such a manner that the expected value of the combined output is A [kW] or less as shown with a waveform WF2 in FIG. 8. Due to this correction, it is possible to bring the variation width of the combined output within A [kW] per arbitrary time B [sec] also at the time (t+1) after the current time t, and therefore the system interconnection can be continued.

According to the first embodiment, the charge/discharge instructing value considering both the wind speed and the remaining capacity is determined, so that the variation in the combined output can be simply and surely suppressed.

(Second Embodiment)

Next, a second embodiment is described. In the descriptions of the second embodiment, constituent elements identical to those of the first embodiment are denoted by like reference characters and redundant descriptions thereof will be omitted.

Figure 9:
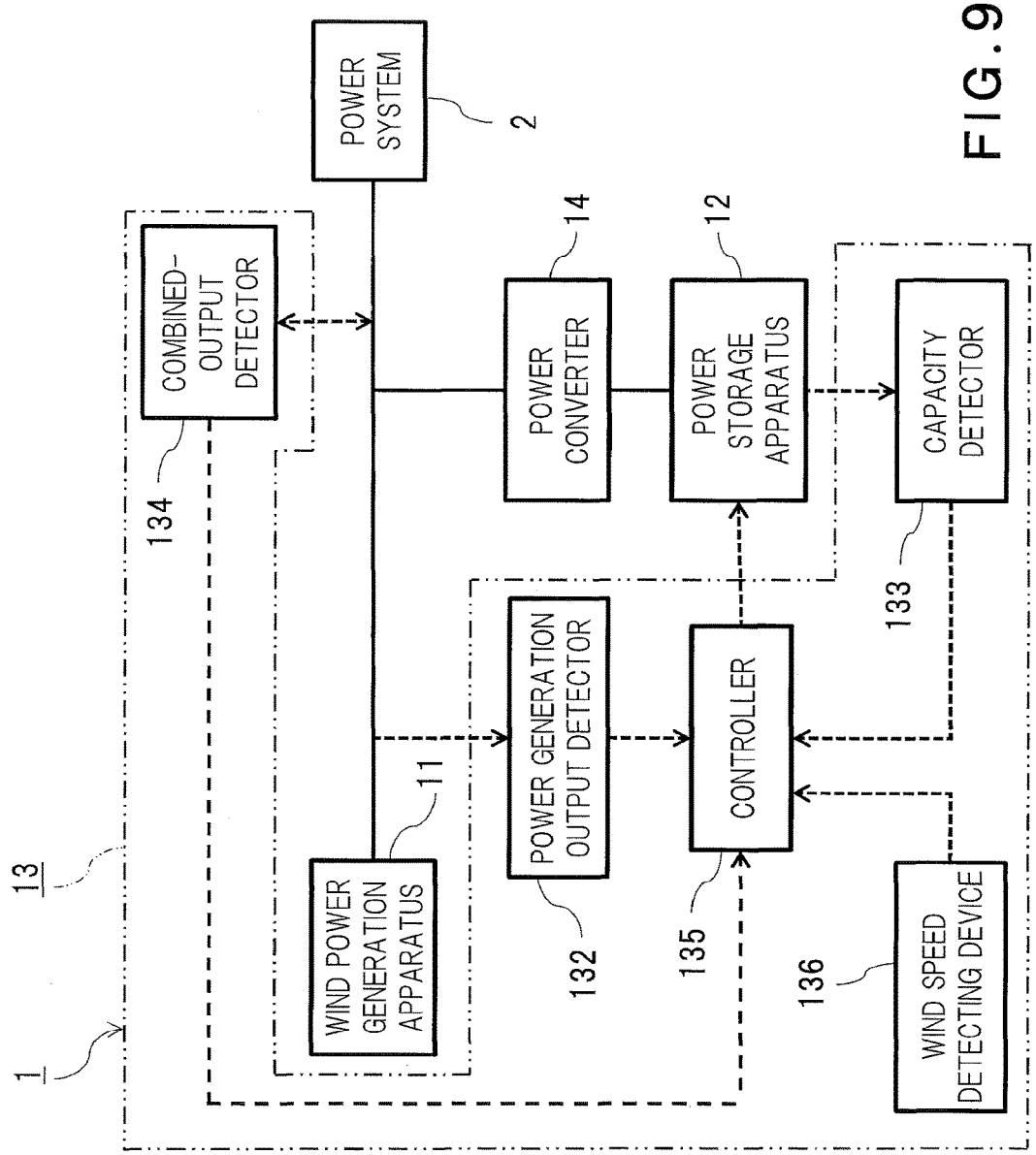
FIG. 9 is a block diagram of the wind power generation system 1 according to a second embodiment.
Figure 10:
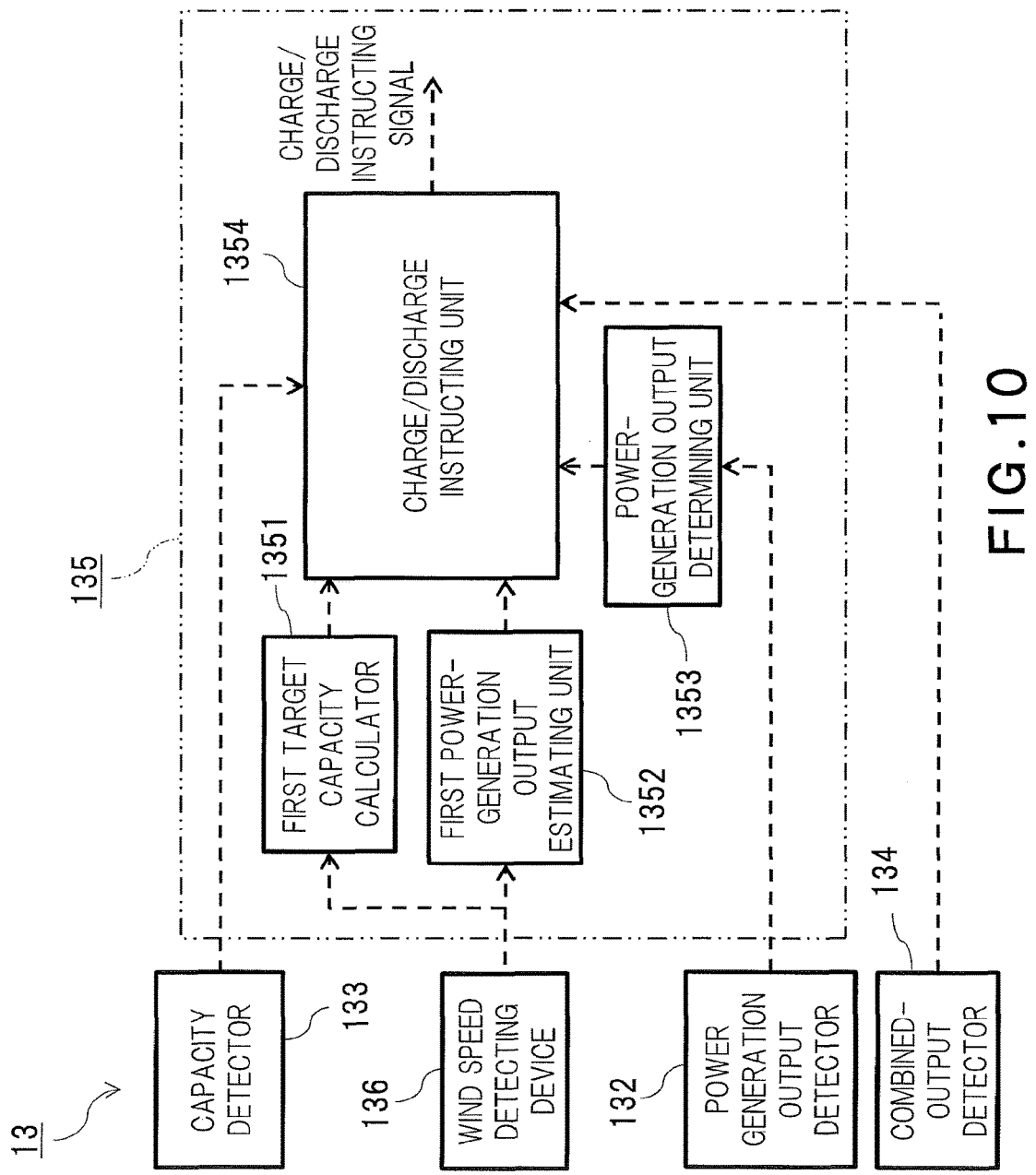
FIG. 10 is a block diagram of the control device 13 of the wind power generation system 1 in FIG. 9.

FIG. 9 is a block diagram of the wind power generation system 1 according to the second embodiment. FIG. 10 is a block diagram of the control device 13 of the wind power generation system 1 in FIG. 9.

As shown in FIGS. 9 and 10, the wind power generation system 1 according to the second embodiment includes a wind speed detecting device 136 in place of the wind speed estimating device 131 according to the first embodiment. The wind speed detecting device 136 actually measures a wind speed, and outputs a wind speed signal indicating the actually measured wind speed to the controller 135 (the first target capacity calculator 1351 and the first power-generation output estimating unit 1352).

The first target capacity calculator 1351 can calculate a target capacity based on the actually measured value of the wind speed. Also, the first power-generation output estimating unit 1352 can estimate increase/decrease in a wind-power-generation output based on the actually measured value of the wind speed.

Therefore, the charge/discharge instructing unit 1354 can determine a charge/discharge instructing value based on the actually measured value of the wind speed. The first target capacity calculator 1351 may acquire a smooth waveform of the wind speed by relieving short-period components of a waveform of the wind speed with a primary delay or a moving average and calculate the target capacity by using the smooth waveform of the wind speed. Also, the first power-generation output estimating unit 1352 may acquire a smooth waveform of an inclination of the wind speed by relieving short-period components of a waveform of the inclination of the wind speed with a primary delay or a moving average and estimate the increase/decrease in the wind-power-generation output by using the smooth waveform of the inclination of the wind speed.

According to the second embodiment, it is possible to perform charge/discharge control for suppressing a variation of a combined output with higher accuracy than in the first embodiment, by considering the actual wind speed.

(Third Embodiment)

Next, a third embodiment is described. In the descriptions of the third embodiment, constituent elements identical to those of the first embodiment are denoted by like reference characters and redundant descriptions thereof will be omitted.

Figure 11:
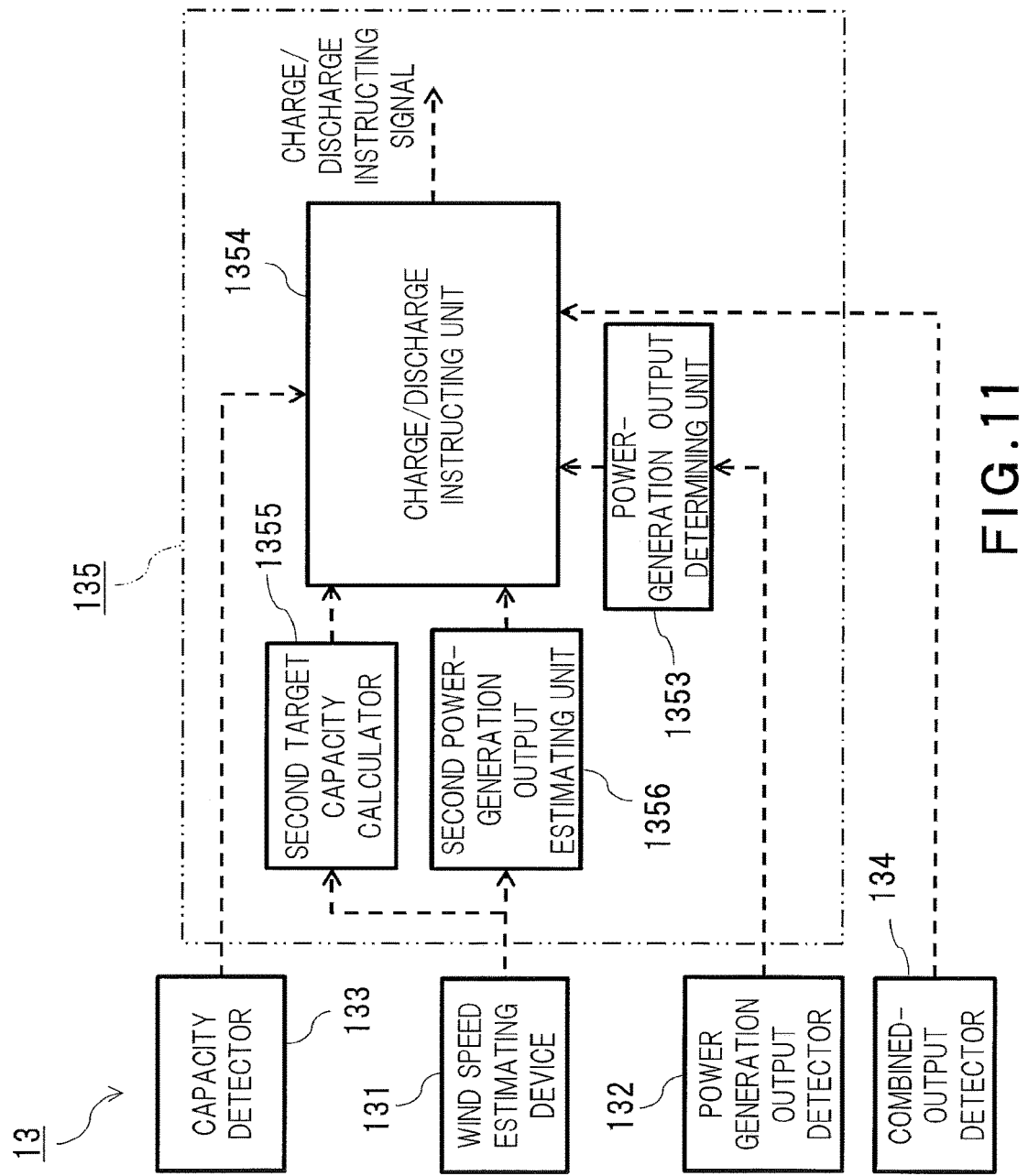
FIG. 11 is a block diagram of the control device 13 according to a third embodiment.
Figure 12:
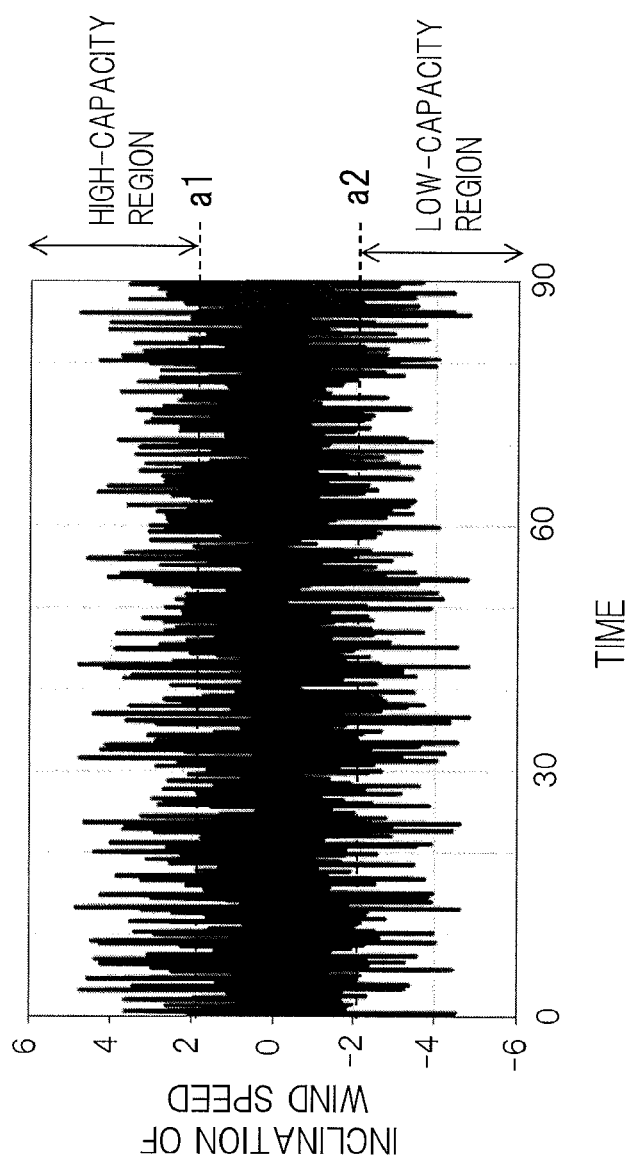
FIG. 12 is a graph showing an operation example of a second target capacity calculator 1355 in the control device 13 in FIG. 11.
Figure 13:
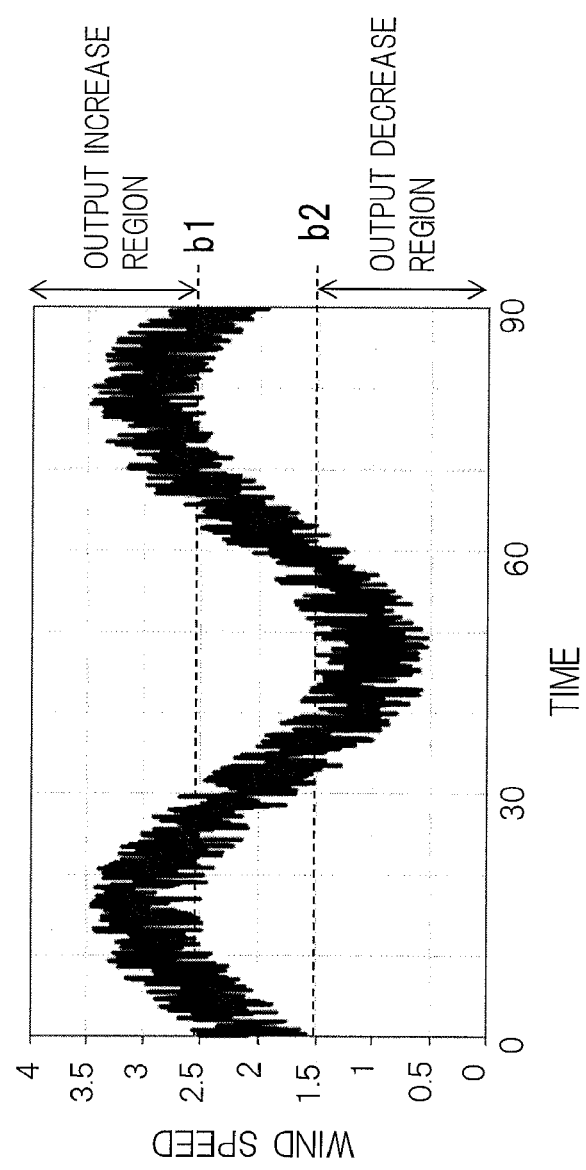
FIG. 13 is a graph showing an operation example of a second power-generation output estimating unit 1356 in the control device 13 in FIG. 11.

FIG. 11 is a block diagram of the control device 13 showing the third embodiment. FIG. 12 is a graph showing an operation example of a second target capacity calculator 1355 in the control device 13 in FIG. 11. FIG. 13 is a graph showing an operation example of a second power-generation output estimating unit 1356 in the control device 13 in FIG. 11.

As shown in FIG. 11, the control device 13 of the wind power generation system 1 according to the third embodiment includes the second target capacity calculator 1355 in place of the first target capacity calculator 1351 (see FIG. 2). Also, the control device 13 according to the third embodiment includes the second power-generation output estimating unit 1356 in place of the first power-generation output estimating unit 1352 (see FIG. 2).

The second target capacity calculator 1355 determines to which of a high-capacity region and a low-capacity region an inclination of a wind speed on the vertical axis in FIG. 12 belongs at a calculation time that comes every unit time in the horizontal axis. When the inclination of the wind speed belongs to the high-capacity region, the second target capacity calculator 1355 calculates a first target capacity as the target capacity. When the inclination of the wind speed belongs to the low-capacity region, the second target capacity calculator 1355 calculates a second target capacity as the target capacity. The second target capacity calculator 1355 may acquire a smooth waveform of the inclination of the wind speed by relieving short-period components of a waveform of the inclination of the wind speed in FIG. 12 with a primary delay or a moving average. The second target capacity calculator 1355 may then calculate the target capacity by using the acquired smooth waveform of the inclination of the wind speed.

The second power-generation output estimating unit 1356 determines to which of an output increase region and an output decrease region the wind speed on the vertical axis in FIG. 13 belongs at an estimation time that comes every unit time in the horizontal axis. When the wind speed belongs to the output increase region, the second power-generation output estimating unit 1356 estimates the increase in the wind-power-generation output. When the wind speed belongs to the output decrease region, the second power-generation output estimating unit 1356 estimates the decrease in the wind-power-generation output. The second power-generation output estimating unit 1356 may acquire a smooth waveform of the wind speed by relieving short-period components of a waveform of the wind speed in FIG. 13 with a primary delay or a moving average. The second power-generation output estimating unit 1356 may then estimate the increase/decrease in the wind-power-generation output by using the acquired smooth waveform of the wind speed.

With the second target capacity calculator 1355, it is possible to set the target capacity to a value matching the inclination of the wind speed. Further, it is possible to simply calculate the target capacity based on a threshold value of the inclination of the wind speed. Furthermore, with the second power-generation output estimating unit 1356, the increase/decrease in the wind-power-generation output can be estimated simply.

According to the third embodiment, it is possible to determine a charge/discharge instructing value simply and appropriately and to suppress a variation in a combined output surely based on the determined charge/discharge instructing value, as in the first embodiment.

The embodiments described above can be combined as appropriate. For example, the wind power generation system 1 can be configured to include the wind speed detecting device 136 described in the second embodiment, as well as the second target capacity calculator 1355 and the second power-generation output estimating unit 1356 described in the third embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A control device of a power storage apparatus, comprising:
    a wind speed acquiring device acquiring a wind speed by estimating the wind speed;
    a power generation output detector detecting a power generation output of a wind power generation apparatus connected to a power system;
    a capacity detector detecting a remaining capacity of the power storage apparatus that stores at least a portion of a power in the power generation output and supplies at least a portion of the stored power to the power system; and
    a controller controlling storage and supply of the power, wherein
    the controller controls storage and supply of the power to suppress a variation in a combined output obtained by combining the power generation output and the power stored or supplied by the power storage apparatus, based on the wind speed, the power generation output, and the remaining capacity, and
    the controller includes
        a first target capacity calculator calculating a target capacity of the power storage apparatus based on the wind speed,
        a first power-generation output estimating unit calculating a wind-speed variation amount based on the wind speed and estimating increase/decrease in the power generation output based on the wind-speed variation amount, and a charge/discharge instructing unit determining a power capable of suppressing the variation in the combined output based on a magnitude relation between the target capacity and the remaining capacity, and the estimated increase/decrease in the power generation output.

2. The control device of claim 1, further comprising a combined-output detector detecting the combined output, wherein
the controller controls storage and supply of the power further based on the detected combined output.

3. The control device of claim 1, wherein
the controller further includes
a power-generation output determining unit determining a current magnitude of the power generation output, and
the charge/discharge instructing unit determines the power capable of suppressing the variation in the combined output further based on the determined magnitude of the power generation output.

4. The control device of claim 3, wherein
the charge/discharge instructing unit determines a power to be stored by the power storage apparatus as the power capable of suppressing the variation in the combined output,
in a case where the remaining capacity is equal to or larger than the target capacity, the increase in the power generation output has been estimated, and the power generation output has been determined to be large,
a case where the remaining capacity is equal to or larger than the target capacity, the decrease in the power generation output has been estimated, and the power generation output has been determined to be large,
a case where the remaining capacity is smaller than the target capacity, the increase in the power generation output has been estimated, and the power generation output has been determined to be large, or
a case where the remaining capacity is smaller than the target capacity and the decrease in the power generation output has been estimated.

5. The control device of claim 4, wherein
the charge/discharge instructing unit determines a power to be supplied by the power storage apparatus as the power capable of suppressing the variation in the combined output,
in a case where the remaining capacity is equal to or larger than the target capacity, the increase in the power generation output has been estimated, and the power generation output has been determined to be small,
a case where the remaining capacity is equal to or larger than the target capacity, the decrease in the power generation output has been estimated, and the power generation output has been determined to be small, or
a case where the remaining capacity is smaller than the target capacity, the increase in the power generation output has been estimated, and the power generation output has been determined to be small.

6. The control device of claim 1, wherein the wind speed acquiring device estimates the wind speed based on at least one of a mathematical model and a statistical model.

7. A wind power generation system comprising:
a wind power generation apparatus connected to a power system;
a power storage apparatus storing at least a portion of a power in a power generation output of the wind power storage apparatus and supplying at least a portion of the stored power to the power system; and
a control device controlling an operation of the power storage apparatus, wherein
the control device includes
a wind speed acquiring device acquiring a wind speed by estimating the wind speed,
a power generation output detector detecting the power generation output,
a capacity detector detecting a remaining capacity of the power storage apparatus, and
a controller controlling storage and supply of the power,
the controller controls storage and supply of the power to suppress a variation in a combined output obtained by combining the power generation output and the power stored or supplied by the power storage apparatus, based on the wind speed, the power generation output, and the remaining capacity, and
the controller includes
a first target capacity calculator calculating a target capacity of the power storage apparatus based on the wind speed,
a first power-generation output estimating unit calculating a wind-speed variation amount based on the wind speed and estimating increase/decrease in the power generation output based on the wind-speed variation amount, and
a charge/discharge instructing unit determining a power capable of suppressing the variation in the combined output based on a magnitude relation between the target capacity and the remaining capacity, and the estimated increase/decrease in the power generation output.

8. A control method of a power storage apparatus, comprising:
acquiring a wind speed by estimating the wind speed;
detecting a power generation output of a wind power generation apparatus connected to a power system;
detecting a remaining capacity of the power storage apparatus that stores at least a portion of a power in the power generation output and supplies at least a portion of the stored power to the power system; and
controlling storage and supply of the power to suppress a variation in a combined output obtained by combining the power generation output and the power stored or supplied by the power storage apparatus, based on the wind speed, the power generation output, and the remaining capacity, wherein
the controlling storage and supply of the power includes
calculating a target capacity of the power storage apparatus based on the wind speed,
calculating a wind-speed variation amount based on the wind speed and estimating increase/decrease in the power generation output based on the wind-speed variation amount, and
determining a power capable of suppressing the variation in the combined output based on a magnitude relation between the target capacity and the remaining capacity, and the estimated increase/decrease in the power generation output.

* * * * *